(12) United States Patent
Ishizaka

(10) Patent No.: US 8,126,301 B2
(45) Date of Patent: Feb. 28, 2012

(54) OPTICAL WAVEGUIDE AND METHOD FOR PRODUCING THE SAME

(75) Inventor: Masashige Ishizaka, Tokyo (JP)

(73) Assignee: NEC Corporation, Tokyo (JP)

(*) Notice: Subject to any disclaimer, the term of this patent is extended or adjusted under 35 U.S.C. 154(b) by 246 days.

(21) Appl. No.: 12/530,759

(22) PCT Filed: Mar. 5, 2008

(86) PCT No.: PCT/JP2008/053924
§ 371 (c)(1),
(2), (4) Date: Sep. 10, 2009

(87) PCT Pub. No.: WO2008/111447
PCT Pub. Date: Sep. 18, 2008

(65) Prior Publication Data
US 2010/0086255 A1    Apr. 8, 2010

(30) Foreign Application Priority Data
Mar. 14, 2007 (JP) ................................. 2007-065083
Feb. 4, 2008 (JP) ................................. 2008-023778

(51) Int. Cl.
G02B 6/10    (2006.01)
G02B 6/26    (2006.01)
B29D 11/00   (2006.01)
H01L 21/00   (2006.01)

(52) U.S. Cl. ............ 385/31; 385/131; 385/43; 385/132; 385/141; 216/51; 438/31

(58) Field of Classification Search .................... 385/14, 385/43, 42, 31, 39, 129, 130, 131, 132, 141; 216/51; 438/31
See application file for complete search history.

(56) References Cited

U.S. PATENT DOCUMENTS
6,281,523 B1 * 8/2001 Iwai et al. ................. 257/98
(Continued)

FOREIGN PATENT DOCUMENTS
JP    9-318830 A    12/1997
(Continued)

OTHER PUBLICATIONS
International Search Report for PCT/JP2008/053924 mailed Apr. 1, 2009.
(Continued)

Primary Examiner — Brian Healy

(57) ABSTRACT

Provided are an optical waveguide and a production method thereof which can constrict both the width and thickness of the SOI optical waveguide core layer in the same process and at the same time, simplify production process, and reduce optical losses. An optical waveguide includes a first clad layer formed on a semiconductor substrate; a first core layer formed on the upper side of the first clad layer with the use of a semiconductor material the refractive index of which is higher than that of the first clad layer; and a second clad layer formed on the upper side of the first core layer with the use of a material the refractive index of which is lower than that of the first core layer. The width of the first core layer is defined based on the width of an unoxidized semiconductor material sandwiched between oxide films the parts of which are thermally oxidized. The thickness of the first core layer is defined based on the thickness of an unoxidized semiconductor material sandwiched between the first clad layer and an oxide film the part of which is thermally oxidized. At least the input/output portion of the optical waveguide has a tapered waveguide portion where the width and thickness of the first core layer monotonically decreases or increases with respect to the propagation direction of light.

14 Claims, 12 Drawing Sheets

U.S. PATENT DOCUMENTS

| | | | |
|---|---|---|---|
| 6,391,214 B1 * | 5/2002 | Kovacic | 216/24 |
| 7,061,954 B2 * | 6/2006 | Iwai et al. | 372/45.01 |
| 2001/0036681 A1 * | 11/2001 | Iwai et al. | 438/31 |
| 2010/0086255 A1 * | 4/2010 | Ishizaka | 385/31 |

FOREIGN PATENT DOCUMENTS

| | | |
|---|---|---|
| JP | 2002-303752 A | 10/2002 |
| JP | 2004-126261 A | 4/2004 |
| JP | 2004-151700 A | 5/2004 |
| JP | 2005-070557 A | 3/2005 |

OTHER PUBLICATIONS

O. Troyanskaya et al., "Missing value Estimation Methods for DNA Microarrays", Oxford University Press, Feb. 26, 2001, pp. 520-525, vol. 17, No. 6.

S. Oba et al., "A Bayesian Missing Value Estimation Method for Gene Expression Profile Data", Bioinformatics, Oxford University Press, May 9, 2003, pp. 2088-2096, vol. 19, No. 16.

H. Kim, et al, "Missing Value Estimation for DNA Microarray Gene Expression Data: Local Least Squares Imputation", Bioinformatics, Oxford University Press, Aug. 27, 2004, pp. 187-198, vol. 21, No. 2.

L. Breiman, "Random Forests", Machine Learning, Kluwer Academics Publishers, 2001, No. 45, pp. 5-32.

V. Svetnik, "Random Forest: A Classification and Regression Tool for Compound Classification and QSAR Modeling", Chem Inf Comput Sci, American Chemical Society, 2003, No. 43, pp. 1947-1958.

* cited by examiner

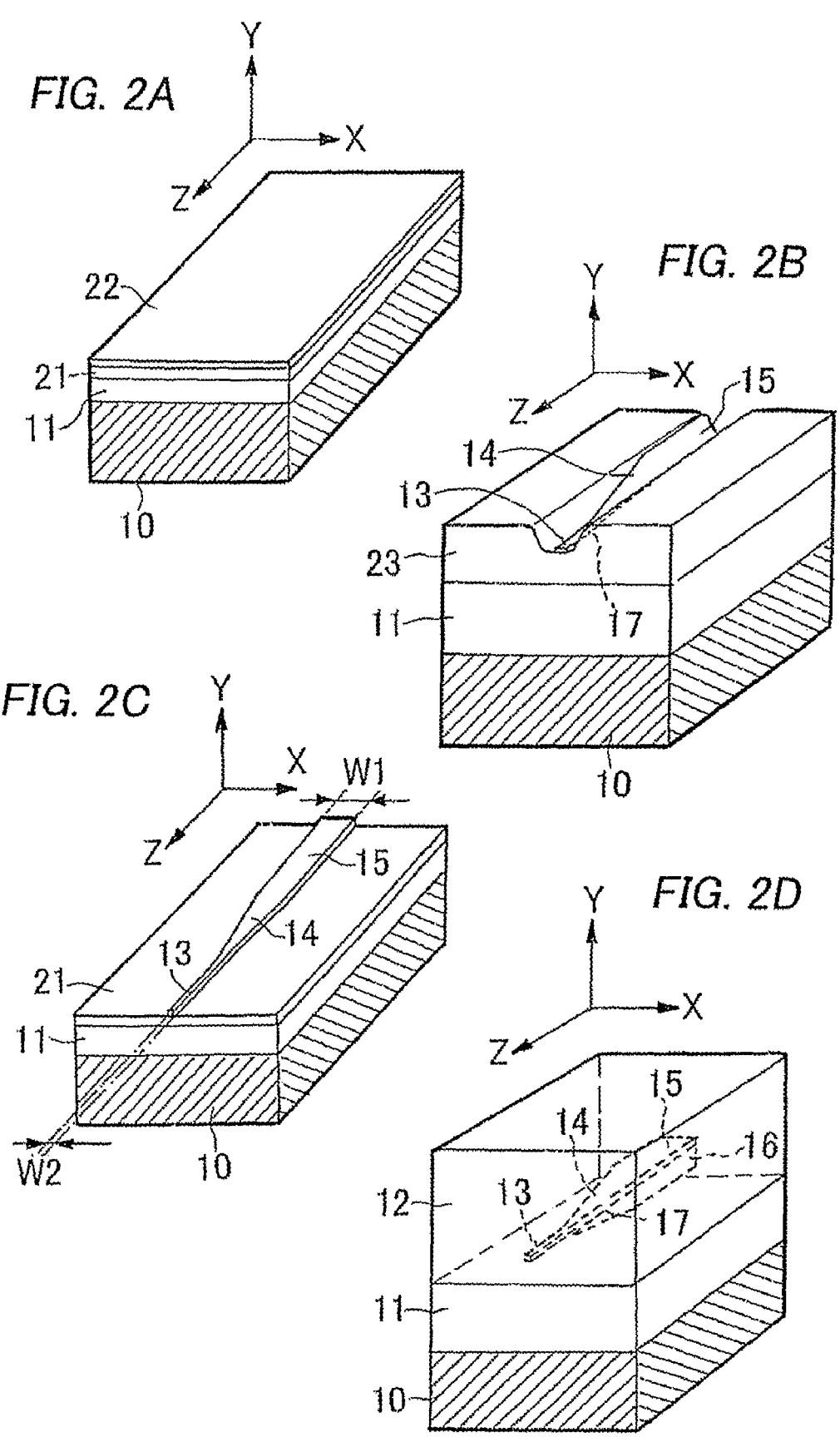

OPTICAL WAVEGUIDE AND METHOD FOR PRODUCING THE SAME

This application is the National Phase of PCT/JP2008/053924 filed on Mar. 5, 2008, which is based upon and claims the benefit of priority from Japanese patent application No. 2007-065083, filed on Mar. 14, 2007, and Japanese Patent Application No. 2008-023778 filed on Feb. 4, 2008, the disclosure of which is incorporated herein its entirety by reference.

TECHNICAL FIELD

The present invention relates to an optical waveguide and a production method thereof, and particularly relates to the configuration of an optical waveguide used in a planar lightwave circuit such as a spot size converter and a directional coupler, and a production method thereof.

BACKGROUND ART

The planar lightwave circuit (PLC), primarily the quartz-type one, has been increasingly developed and put to practical use, and plays an important role as an essential component in bolstering the recent optical communication market including AWG (Arrayed Waveguide Grating) and splitters. Moreover, in recent years, elements having new functions, such as the hybrid wavelength variable light source the semiconductor optical amplifier (SOA) of which is mounted on the quartz PLC, has been developed. Attempts are vigorously made to realize a smaller and more inexpensive system on one chip than before by mounting the active and passive devices on the common PLC substrate.

However, as the functions required become more complex and sophisticated, the size of the elements of the planar lightwave circuit increases and more power is required to drive the planar lightwave circuit, coming close to the limits in function and performance of the conventional quartz type. Accordingly, there is progress in the research and development of SOI (Silicon on Insulator) waveguides with the use of Si microfabrication techniques involving a Si wire and a photonic crystal (PC), and the possibility of a small, low-power-consumption, and low-cost essential component is being examined.

In particular, the Si wire is an optical waveguide that can dramatically reduce the size of the conventional PLC. In downsizing the PLC with the use of the SOI waveguide, Si is used as the core material to increase the relative refractive index difference with respect to the clad material ($SiO_2$ or the dielectric material thereof), thereby realizing a minute optical circuit.

The relative refractive index difference $\Delta$ of the conventional quartz type is just around 5% and the bend radius thereof is about 500 μm, whereas $\Delta$ of the Si wire optical waveguide is more than 40% and the bend radius thereof is several microns. However, an increase in the relative refractive index difference requires the diameter of the core to be smaller to meet the single mode condition of the propagation light, leading to a difference in spot size between the optical fiber and other optical waveguide elements. Therefore, the problem is that optical coupling losses increase.

In order to solve the problem, several methods have been proposed to enlarge the spot size. As proposed in Patent Document 1, the simplest method is a widely known method to decrease only the width of the waveguide. However, since the thickness of the waveguide remains unchanged, the field of the propagation light is elliptical in shape. Therefore, the coupling losses with the optical fiber cannot be sufficiently reduced. On the other hand, also proposed is a method to taper the thickness of the waveguide as well. Proposed in Patent Document 2 or 3 is a method to form the thickness of the waveguide independently of the width of the waveguide. However, the method is a combination of a plurality of processes, leading to complicated production processes. If the width and thickness of the waveguide core layer can be changed in the same process and at the same time, the production processes can be simplified and manufacturing variations can be suppressed, making it possible to realize the low-cost spot size conversion with high yields.

Patent Document 1: JP-A-2004-151700
Patent Document 2: JP-A-2005-70557
Patent Document 3: JP-A-2002-303752

SUMMARY OF INVENTION

Technical Problem

As described above, the spot size conversion of the input/output waveguide section of the SOI optical waveguide is necessary to reduce the insertion losses of the SOI optical waveguide. However, according to the conventional method, the problem is that the production processes are complicated because the process of constricting the width of the waveguide core with the use of the etching process of the semiconductor layer is different from the process of reducing the height of the waveguide core. Another problem is that optical propagation losses increase due to the etching process of the semiconductor layer.

The present invention has been made to solve such problems. The objective of the present invention is to provide an optical waveguide and a production method thereof which can constrict both the width and thickness of the SOI optical waveguide core layer in the same process and at the same time, simplify production process, and reduce optical losses.

Solution to Problem

To achieve the above objective, according to the present invention, an optical waveguide includes: a first clad layer formed on a semiconductor substrate; a first core layer formed on the upper side of the clad layer with the use of a semiconductor material the refractive index of which is higher than that of the first clad layer; and a second clad layer formed on the upper side of the first core layer with the use of a material the refractive index of which is lower than that of the first core layer, wherein the width of the first core layer is defined based on the width of an unoxidized semiconductor material sandwiched between oxide films the parts of which are thermally oxidized; the thickness of the first core layer is defined based on the thickness of an unoxidized semiconductor material sandwiched between the first clad layer and an oxide film the part of which is thermally oxidized; and at least the input/output portion of the optical waveguide has a tapered waveguide portion where the width and thickness of the first core layer monotonically decrease or increase with respect to the propagation direction of light.

According to the present invention, a first production method for an optical waveguide includes: a step of forming a silicon nitride film on the upper surface of a silicon upper layer of a SOI substrate having the silicon upper layer formed on the upper surface of a silicon oxide film on a silicon substrate; a step of carrying out patterning to form the silicon nitride film in the shape of a stripe so that the silicon nitride film has a tapered portion the width of which monotonically changes; a step of carrying out LOCOS oxidation while the silicon nitride film formed by patterning is used as a mask in order to form a second clad layer and also form on the lower side of the silicon nitride film a first core layer of silicon whose width monotonically narrows in the direction of stripe and whose thickness too narrows monotonically; a step of removing the silicon nitride film; and a step of stacking a third clad layer after removing the silicon nitride film.

According to the present invention, a second production method for an optical waveguide includes: a step of forming a silicon nitride film on the upper surface of a silicon upper layer of a SOI substrate having the silicon upper layer formed on the upper surface of a silicon oxide film on a silicon substrate; a step of carrying out patterning to form the silicon nitride film in the shape of a stripe so that the silicon nitride film has a tapered portion the width of which monotonically changes; a step of carrying out the LOCOS oxidation while the silicon nitride film formed by patterning is used as a mask in order to form a second clad layer and also form on the lower side of the silicon nitride film a first core layer whose width monotonically narrows in the direction of stripe, whose thickness too narrows monotonically, and whose silicon layer disappears at a tapered tip section; and a step of stacking a third clad layer on the upper side of the silicon nitride film.

According to the present invention, a third production method for an optical waveguide includes: a step of forming a silicon nitride film on the upper surface of a silicon upper layer of a SOI substrate having the silicon upper layer formed on the upper surface of a silicon oxide film on a silicon substrate; a step of carrying out patterning to form the silicon nitride film in the shape of a stripe so that the silicon nitride film has a tapered portion the width of which monotonically changes; a step of forming a silicon mesa by removing part of the silicon upper layer in an etching process in which the silicon nitride film formed by patterning is used as a mask; a step of carrying out the LOCOS oxidation on the silicon mesa while the silicon nitride film formed by patterning is used as a mask in order to form on the lower side of the silicon nitride film a first silicon core layer whose width monotonically narrows in the direction of stripe, whose thickness too narrows monotonically, and whose silicon layer disappears at a tapered tip section; and a step of stacking the third clad layer on the upper side of the silicon nitride film.

ADVANTAGEOUS EFFECTS OF INVENTION

According to the present invention, both the width and thickness of the SOI optical waveguide core layer can be constricted in the same process and at the same time. Therefore, provided are the optical waveguide and the production method thereof which can simplify production processes and reduce optical losses.

BRIEF DESCRIPTION OF DRAWINGS

FIGS. 2A to 2D are perspective views illustrating the production steps of the optical waveguide according to the Example 1 of the present invention.

EXPLANATION OF REFERENCE SYMBOLS

Figure 1:
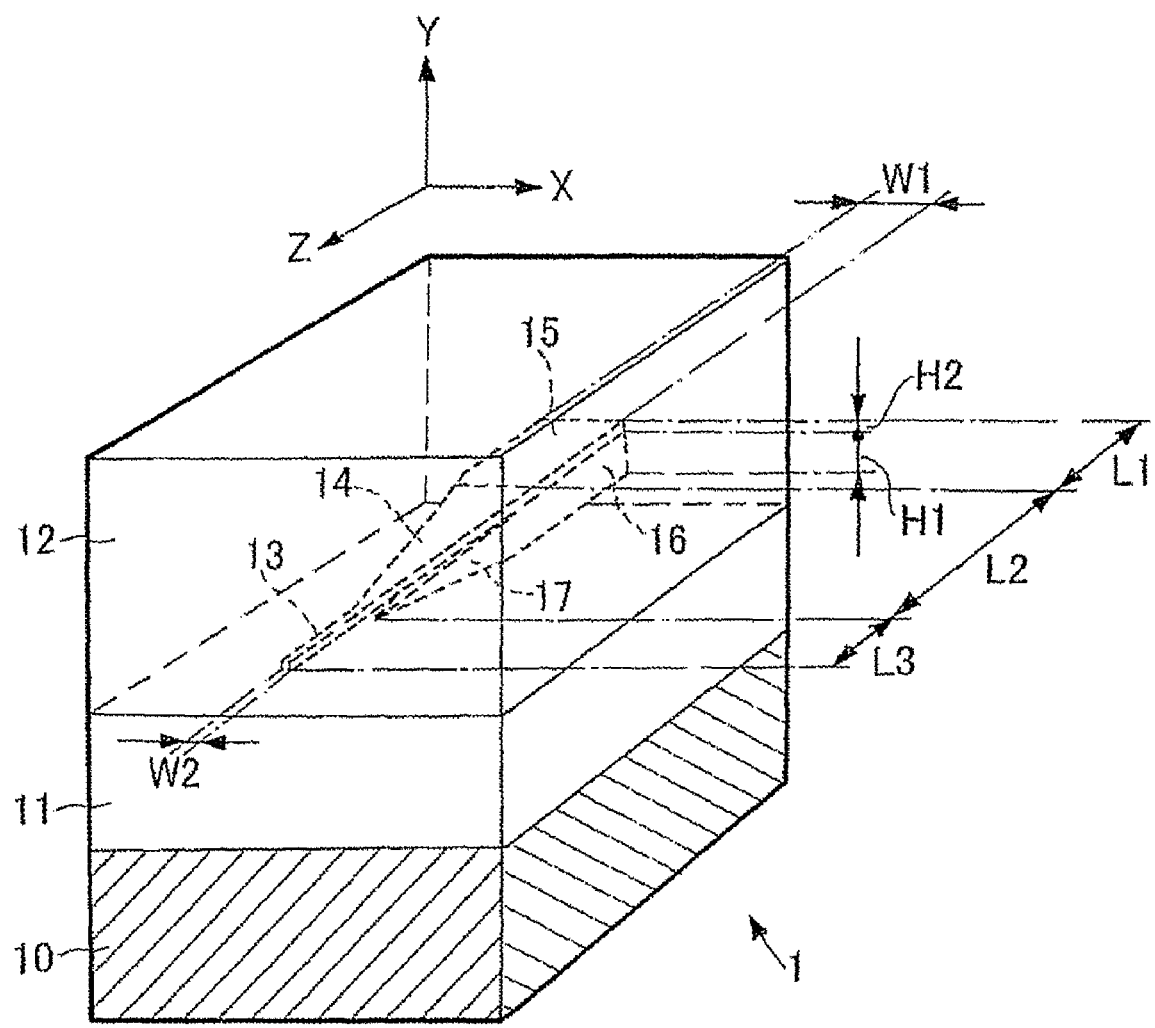
FIG. 1 is a perspective view illustrating the configuration of an optical waveguide according to an Example 1 of the present invention.
Figure 3A:
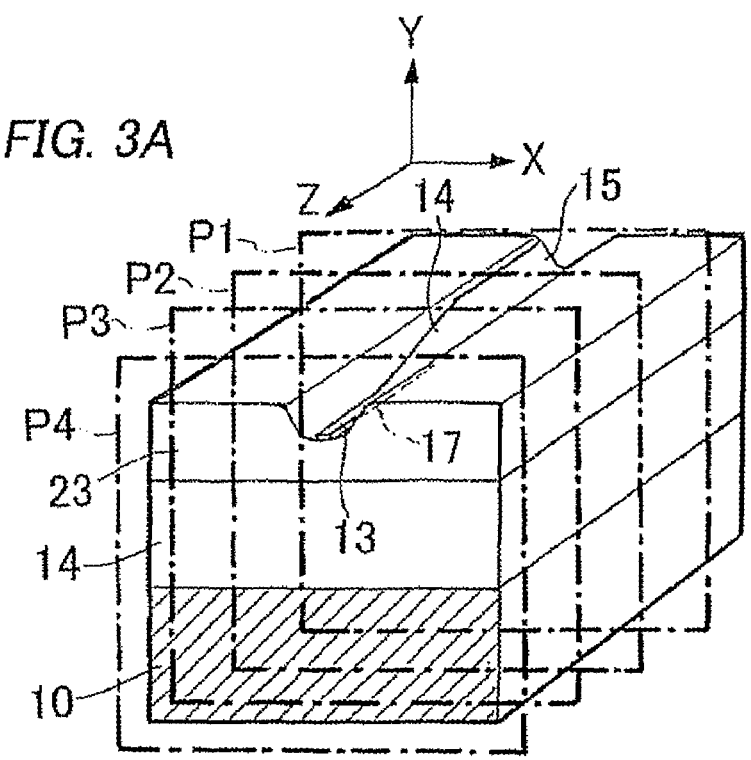
FIGS. 3A to 3E are schematic diagrams illustrating the cross-section structure of each portion in the direction of the waveguide during the step of FIG. 2C.
Figure 3B:
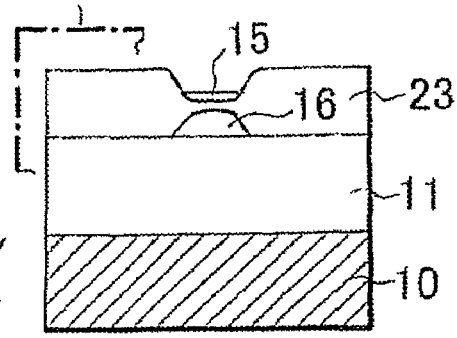
Figure 3D:
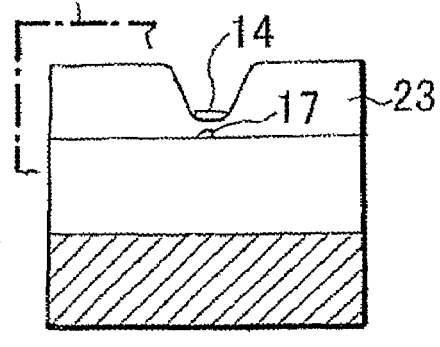
Figure 3C:
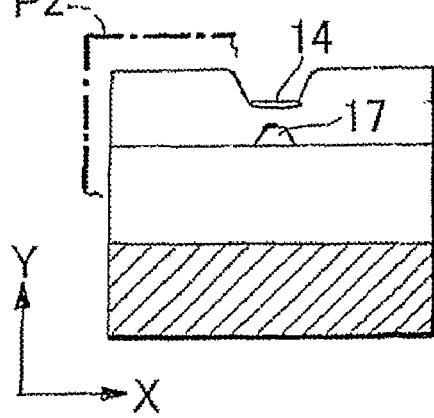
Figure 3E:
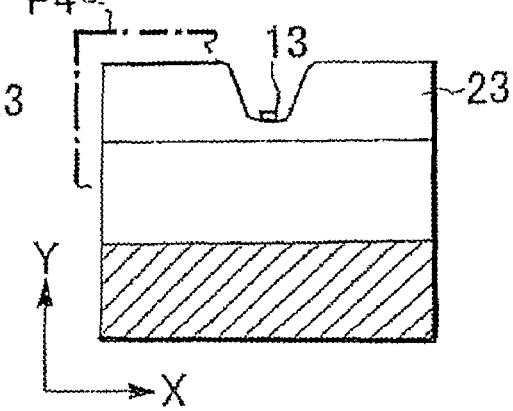

1: Optical waveguide
10: Silicon substrate
11: Silicon oxide film (First clad layer)
12: Silicon oxide film (Second and Third clad layers)
13: Silicon nitride film core layer (Second core layer)
14: Silicon nitride film taper core layer (Second core layer)
15: Silicon nitride film core layer (Second core layer)
16: Silicon core layer (First core layer)
17: Silicon taper core layer (First core layer: Tapered waveguide section)
18: Tapered stripe (Silicon nitride film mask)
19: Linear stripe (Silicon nitride film mask)
21: Silicon upper layer
22: Silicon nitride film
23: Oxide film formed by LOCOS method
41: Silicon core layer
40: Silicon taper core layer (First core layer: Tapered waveguide section)
50: First silicon taper core layer (First core layer: Tapered waveguide section)
51: Silicon core layer
52: Second silicon taper core layer (First core layer: Tapered waveguide section)
P11, P12, P13: Planes representing the cross-section portions of the waveguide
Δa: Distance between the center of optical wave power at the first core layer and the center of optical wave power at the second core layer

DESCRIPTION OF EMBODIMENTS

The following describes in detail an exemplary embodiment of the present invention with reference to the accompanying diagrams.

According to the present exemplary embodiment, an optical waveguide includes a first clad layer formed on a semiconductor substrate; a first core layer formed on the upper side of the clad layer with the use of a semiconductor material the refractive index of which is higher than that of the first clad layer; and a second clad layer formed on the upper side of the first core layer with the use of a material the refractive index of which is lower than that of the first core layer. The width of the first core layer is defined based on the width of an unoxidized semiconductor material sandwiched between oxide films the parts of which are thermally oxidized. The thickness of the first core layer is defined based on the thickness of an unoxidized semiconductor material sandwiched between the first clad layer and an oxide film the part of which is thermally oxidized. At least the input/output portion of the optical waveguide has a tapered waveguide portion where the width and thickness of the first core layer monotonically decreases or increases with respect to the propagation direction of light.

According to the above configuration, the following structures may be applied:

a) The first core layer has disappeared and does not exist at the tip of the tapered waveguide portion where the cross-sectional area of the first core layer monotonically decreases. A second core layer formed by the patterning of a dielectric material the refractive index of which is higher than that of the second clad layer is loaded onto the upper side of the first core layer. The second core layer, like the first core layer, has a portion the width of which monotonically changes in the propagation direction of light. In addition, the second core layer having a constant width is formed as well on the upper side of the area where the first core layer has disappeared. A third clad layer consisting of a material the refractive index of which is lower than that of the second core layer is formed on the upper side of the second core layer.

b) The first core layer has disappeared at the tip of the tapered waveguide portion where the cross-sectional area of the first core layer monotonically decreases. A second core layer formed by the patterning of a dielectric material the refractive index of which is higher than that of the second clad layer is loaded onto the upper side of the first core layer. The second core layer, like the first core layer, has a portion the width of which monotonically changes in the propagation direction of light. In addition, the second core layer having a constant width is formed as well on the upper side of the area where the first core layer has disappeared. The midpoint of the height of the first core layer is so formed as to monotonically approach the second core layer in the direction of the waveguide (the propagation direction of light). A third clad layer consisting of a material the refractive index of which is lower than that of the second core layer is formed on the upper side of the second core layer.

c) The third clad layer may be made of a polymer material.

d) The first core layer may be made of silicon, and the second and third clad layers may be made of a silicon oxide film. The second core layer may be made of a silicon nitride film.

According to the present exemplary embodiment, a production method for the optical waveguide includes the following steps a1) to a5):

a1) a step of forming a silicon nitride film on the upper surface of a silicon upper layer of a SOI substrate having the silicon upper layer formed on the upper surface of a silicon oxide film on a silicon substrate.

a2) a step of carrying out patterning to form the silicon nitride film in the shape of a stripe so that the silicon nitride film has a tapered portion the width of which monotonically changes.

a3) a step of carrying out LOCOS (Local oxidation of Silicon) oxidation while the silicon nitride film formed by patterning is used as a mask in order to form a second clad layer and also form on the lower side of the silicon nitride film a first core layer of silicon whose width monotonically narrows in the direction of stripe and whose thickness too narrows monotonically.

a4) a step of removing the silicon nitride film.

a5) a step of stacking a third clad layer after removing the silicon nitride film.

Moreover, as an another example, there may be the following steps b1) to b4).

b1) a step of forming a silicon nitride film on the upper surface of a silicon upper layer of a SOI substrate having the silicon upper layer formed on the upper surface of a silicon oxide film on a silicon substrate.

b2) a step of carrying out patterning to form the silicon nitride film in the shape of a stripe so that the silicon nitride film has a tapered portion the width of which monotonically changes.

b3) a step of carrying out the LOCOS oxidation while the silicon nitride film formed by patterning is used as a mask in order to form a second clad layer and also form on the lower side of the silicon nitride film a first silicon core layer whose width monotonically narrows in the direction of stripe, whose thickness too narrows monotonically, and whose silicon layer disappears at a tapered tip section.

b4) a step of stacking a third clad layer on the upper side of the silicon nitride film.

Furthermore, there may be the following steps c1) to c5).

c1) a step of forming a silicon nitride film on the upper surface of a silicon upper layer of a SOI substrate having the silicon upper layer formed on the upper surface of a silicon oxide film on a silicon substrate.

c2) a step of carrying out patterning to form the silicon nitride film in the shape of a stripe so that the silicon nitride film has a tapered portion the width of which monotonically changes.

c3) a step of forming a silicon mesa by removing part of the silicon upper layer in an etching process in which the silicon nitride film formed by patterning is used as a mask.

c4) a step of carrying out the LOCOS oxidation on the silicon mesa while the silicon nitride film is used as a mask in order to form on the lower side of the silicon nitride film a first core layer whose width monotonically narrows in the direction of stripe, whose thickness too narrows monotonically, and whose silicon layer disappears at a tapered tip section.

c5) a step of stacking the third clad layer on the upper side of the silicon nitride film.

Moreover, a step of stacking the silicon oxide film using the CVD (Chemical Vapor Deposition) method may be used as a step of forming the third clad layer. Moreover, a step of stacking the silicon oxide film using a sputtering method may be used as a step of forming the third clad layer. Furthermore, a step of forming a polymer film using a spin coating method may be used as a step of forming the third clad layer.

The following describes the operation of the present exemplary embodiment.

According to the present exemplary embodiment, the optical waveguide has a spot size conversion portion at the input/output portion thereof. Since the field diameter of the spot size conversion portion changes adiabatically (without losing most of the power) in the propagation direction of light waves so that the field diameter is equal to the spot size of the optical fiber and other optical waveguide elements, the coupling losses can be reduced. Especially, since the width and thickness of the waveguide core layer can be changed in the same process and at the same time, the process can be simplified.

According to the present exemplary embodiment, the stripe-shaped silicon nitride film having the tapered portion is formed on the upper-side silicon layer of the SOI substrate, and the LOCOS oxidation is carried out with the silicon nitride film being used as a mask. Since oxidizing species (oxide ions) disperse from the upper surface of silicon, other than the silicon nitride film serving as a mask, in the LOCOS oxidation process of forming the $SiO_2$ films, the $SiO_2$ layers are formed on both sides of the mask. Moreover, the oxidizing species also disperse to the boundary face between the mask and the silicon layer. Therefore, in an area where the width of the mask is narrow, the levels of oxidizing species which have dispersed and got into from both sides of the mask increase even just under the mask, leading to a decrease in thickness of the silicon layer due to oxidization. That is, it is possible to decrease the width and even thickness of the silicon layer by gradually narrowing the width of the mask. Therefore, the tapered optical waveguide core layer can be formed.

Moreover, without removing the silicon nitride film used as a mask, the silicon nitride film can substitute for the Si core layer removed by the LOCOS oxidation as a core layer. The refractive index of the silicon nitride film is lower than the refractive index of Si. Therefore, the advantage is that the spot size can be more easily enlarged.

On the other hand, with the above-mentioned silicon nitride film used as a mask, the LOCOS oxidation is performed on the mesa shape which is formed by removing part of the silicon layer in the etching process with the above-mentioned silicon nitride film used as a mask. Since the oxidization speed at the side wall of the silicon layer formed by etching is faster than the oxidization speed at the boundary surface between the silicon nitride film and the silicon layer, the silicon layer can be monotonically removed so that the center of the silicon layer approaches the above-mentioned silicon nitride film in the direction of stripe. In this case, the center of an optical wave can be smoothly transferred from the first core layer to the second core layer. The advantage is that excessive losses can be reduced.

As described above, in the optical waveguide according to the present exemplary embodiment, the tapered shape the width and thickness of which are equal to those of the Si core layer can be formed in the same process and at the same time. Therefore, the low-cost spot size conversion optical waveguide can be realized with the simple production process.

In the optical waveguide of the present exemplary embodiment, the width and thickness of the silicon core layer are changed by the LOCOS process at the same time to form the tapered waveguide necessary for spot size conversion in order to reduce the coupling losses with the optical fiber.

Therefore, according to the present exemplary embodiment, the following effects can be obtained.

The first effect is that coupling losses can be reduced without increasing propagation losses. That is, since the tapered core layer can be formed without etching the silicon layer, the side wall and the core layer are not damaged by etching, resulting in a decrease in optical propagation losses.

The second effect is that optical excessive losses associated with spot size conversion can be reduced. This is attributable to a reduction in conversion loss of an optical wave mode, which is made possible by enlarging the spot size while the center of an optical wave field is continuously and smoothly transferred.

The third effect is a reduction in costs thanks to the simplified production process. That is, different processes are not necessary to transform the width and the thickness into a tapered shape; one process (the LOCOS process) can change the vertical and horizontal dimensions at the same time to form the tapered waveguide.

The fourth effect is the highly accurate structure control of the spot size conversion waveguide. That is, the LOCOS process is used in controlling the shape of the tapered waveguide; the conditions of thermal oxidization including temperatures and humidity, as well as the width of the mask, are adjusted. Therefore, it is possible to accurately control the tapered shape.

The fifth effect is that variation in performance of spot size conversion can be suppressed. That is, in the tapered optical waveguide, the input/output end face needs to be formed at a predetermined taper position. However, especially in the silicon waveguide the relative refractive index difference of which is large, the core layer is several dozen nanometers in size and therefore has a microscopic core cross-section surface, causing variation in spot size thanks to variation in position where the end face is formed. According to the present exemplary embodiment, the second core layer that is loaded onto the upper side of the silicon core layer is formed using the silicon nitride film the relative refractive index difference of which is low, and the second core layer with the constant stripe width and the predetermined length is produced. Therefore, variation in position where the end face is produced can be suppressed.

The following describes specific examples of the present invention.

EXAMPLE 1

FIG. 1 is a perspective view illustrating the configuration of an optical waveguide 1 according to Example 1 of the present invention. Incidentally, for ease of explanation, the directions of the width, thickness (height), length (waveguide) of the optical waveguide 1 will be referred to as X, Y, and Z directions, respectively, hereinafter.

The optical waveguide 1 of the present example shown in FIG. 1 is the one applied to the spot size conversion optical waveguide (a spot size converter), and uses a SOI substrate including a silicon substrate 10 and a silicon oxide film 11 containing a first clad layer formed on the silicon substrate 10.

Formed on the upper side of the SOI substrate are a linear silicon core layer 16; and a silicon taper core layer (forming a tapered waveguide section of the present invention) 17, the X-direction width and Y-direction thickness of which monotonically decrease to form a tapered shape along the Z direction (the direction of the waveguide) and which is continuously connected to the silicon core layer 16. The silicon core layer 16 and the silicon taper core layer 17 are formed at the same plane (the ZX plane). In the example illustrated in the diagram, the X-direction width, Y-direction thickness, and Z-direction length of the silicon core layer 16 are W1, H1, and L1, respectively. The X-direction width of the silicon taper core layer 17 continuously decreases from W1 to W2; the Y-direction thickness continuously decreases from H1 to zero; the Z-direction length is L2. The silicon core layer 16 and the silicon taper core layer 17 form a first core layer.

Formed on the upper sides of the silicon core layer 16 and the silicon taper core layer 17 are a silicon nitride film core layer 15, which is made of a silicon nitride film and consists of a stripe-shaped film; a silicon nitride film taper core layer 14, which consists of a tapered film; and a silicon nitride film core layer 13, which consists of a stripe-shaped film; the silicon nitride film core layer 15, the silicon nitride film taper core layer 14, and the silicon nitride film core layer 13 are continuously formed in the Z direction. In the example illustrated in the diagram, the X-direction width, Y-direction thickness, and Z-direction length of the silicon nitride film core layer 15 are W1, H2, and L1, respectively. The X-direction width of the silicon nitride film taper core layer 14 continuously decreases from W1 to W2; the Y-direction thickness is H2; the direction length is L2. The X-direction width, Y-direction thickness, and direction length of the silicon nitride film taper core layer 13 are W2, H2, and L3, respectively. The silicon nitride film core layer 13, the silicon nitride film taper core layer 14, and the silicon nitride film core layer 15 form the second core layer.

In the above configuration, on the lower side of the silicon nitride film taper core layer 13 the X-direction width of which is smallest among those of the silicon nitride film core layer 13, the silicon nitride film taper core layer 14, and the silicon nitride film core layer 15, the silicon taper core layer 17 does not exist, and the waveguide core layer is formed only by the silicon nitride film taper core layer 13. That is, the silicon taper core layer 17 disappears at the terminal section of the silicon nitride film taper core layer 14.

Furthermore, an area around the first core including the silicon core layer 16 and the silicon taper core layer 17 and the second core including the silicon nitride film core layer 13, the silicon nitride film taper core layer 14 and the silicon nitride film core layer 15 is covered with a clad layer 12 made of a silicon oxide film. The clad layer 12 forms a second clad layer, which is formed on the upper side of the first core layer and is made of a material the refractive index of which is lower than that of the first core layer; and a third clad layer, which is formed on the upper side of the second core layer and made of a material the refractive index of which is lower than that of the second core layer.

The following describes the operational mechanism of the present example.

First, an optical wave input into the optical waveguide 1 travels through the portion of the length L1 of the optical waveguide 1 the core layer of which includes the silicon core layer 16 and the silicon nitride film core layer 15 in the Z direction. The spot size of the traveling optical wave gradually increases at the portion of the length L2 of the tapered optical waveguide 1 the core layer of which includes the silicon taper core layer 17 and the silicon nitride film taper core layer 14, and the traveling optical wave then reaches the terminal section of the silicon taper core layer 17 where the optical wave is coupled with the portion of the length L3 of the optical waveguide 1 the core layer of which includes the silicon nitride film core layer 13. From the terminal section, the optical wave, with the spot size being maintained at a constant level, travels to the output end of the optical waveguide 1 in the Z direction, and is then optically coupled with an external optical fiber (not shown) with low loss.

Here, the relative refractive index difference of the silicon nitride film core layer 13 with respect to the clad layer 12 is lower than that of the silicon core layer, and a microscopic stripe, the size of which is substantially the same as that of the silicon layer, is not required to enlarge the spot size. Therefore, it is possible to increase the manufacturing tolerance of patterning.

Moreover, the size of the silicon nitride film core layer 13 remains unchanged in the traveling direction of the optical wave; the spot size of the optical wave too remains unchanged in the traveling direction thereof. Therefore, the manufacturing position of the optical output end face, or the tolerance level of the waveguide element with respect to the cut-off position, can be set freely.

The following describes the production method of the present example.

FIG. 2 is a schematic diagram illustrating the steps of the production method of the optical waveguide 1.

1) Step of FIG. 2A

First, on the upper side of the silicon substrate 10, the silicon oxide film 11, which becomes the first clad layer, and a silicon upper layer 21, which becomes the first core layer, are sequentially formed, and the SOI substrate is formed. On the SOI substrate, a silicon nitride film 22, which becomes the second core layer, is stacked using the plasma CVD method (FIG. 2A).

2) Step of FIG. 2B

Then, the stripes the widths W1 and W2 of which are different from each other and which respectively correspond to the silicon nitride film core layer 15 and the silicon nitride film core layer 13 are formed by patterning in a typical photolithography process on the stacked silicon nitride film 22 so that the tapered stripe corresponding to the silicon nitride film taper core layer 14 is sandwiched between the above stripes and that the stripes are continuously connected (FIG. 2B).

3) Step of FIG. 2C

Subsequently, thermal oxidization is conducted according to the LOCOS method with the stripe pattern of the silicon nitride film 22 formed by patterning, or the silicon nitride film core layer 13, the silicon nitride film taper core layer 14 and the silicon nitride film core layer 15, being used as a mask (FIG. 2C). Since the $SiO_2$ film is formed in LOCOS oxidation while oxidizing species (oxide ions) disperse from the upper side of the silicon layer 21 other than the mask, the $SiO_2$ layers (the silicon oxide films) 23 are formed on both sides of the mask.

Moreover, the oxidizing species also disperse to the boundary face between the mask and the silicon upper layer 21. Therefore, in an area where the width of the mask is narrow, silicon is transformed into the silicon oxide film 23 even beneath the mask due to the oxidizing species which have dispersed and got into from both sides of the mask, leading to a decrease in thickness of the silicon upper layer 21. That is, it is possible to decrease the width and even thickness of the silicon upper layer 21 by gradually narrowing the width of the mask. Therefore, the tapered optical waveguide core layer, or the silicon taper core layer 17, can be formed. Moreover, depending on the width of the mask and the conditions of thermal oxidization, the entire silicon upper layer 21 beneath the mask may be transformed into the silicon oxide film 23. According to the present example, the silicon core layer 21 beneath the tip of the silicon nitride film taper core layer 14 which is a mask has disappeared due to oxidization.

FIG. 3 is a schematic diagram illustrating the cross-section configuration of each portion in the direction of the waveguide (the Z direction) in the step of FIG. 2C. FIGS. 3B, 3C, 3D and 3E are cross-section views of the one shown in FIG. 2C taken along the planes P1, P2, P3 and P4 shown in FIG. 3A. From the cross-section plane P1 to P2 and then to P3, the silicon core layer 16 is being transformed into the silicon taper core layer 17. Moreover, the width and thickness of the silicon taper core layer 17 monotonically decreases, and the silicon taper core layer 17 disappears at the cross-section plane P4.

4) Step of FIG. 2D

In the final production step, the first core layer, which includes the silicon core layer 16 and the silicon taper core layer 17, and the second core layer, which includes the silicon nitride film core layer 13, the silicon nitride film taper core layer 14 and the silicon nitride film core layer 15, are embedded in the silicon oxide film, which becomes the second and third clad layers or the clad layer 12, by the CVD process (FIG. 2D).

In the present example, thanks to the steps described above, the simple process can make the optical waveguide 1, or the spot size conversion optical waveguide, which makes spot size conversion possible as illustrated in FIG. 1 without using the etching process of silicon.

EXAMPLE 2

The following describes Example 2 of the present invention. The optical waveguide of the present example is applied to a widely-known spot size conversion waveguide.

Figure 4:
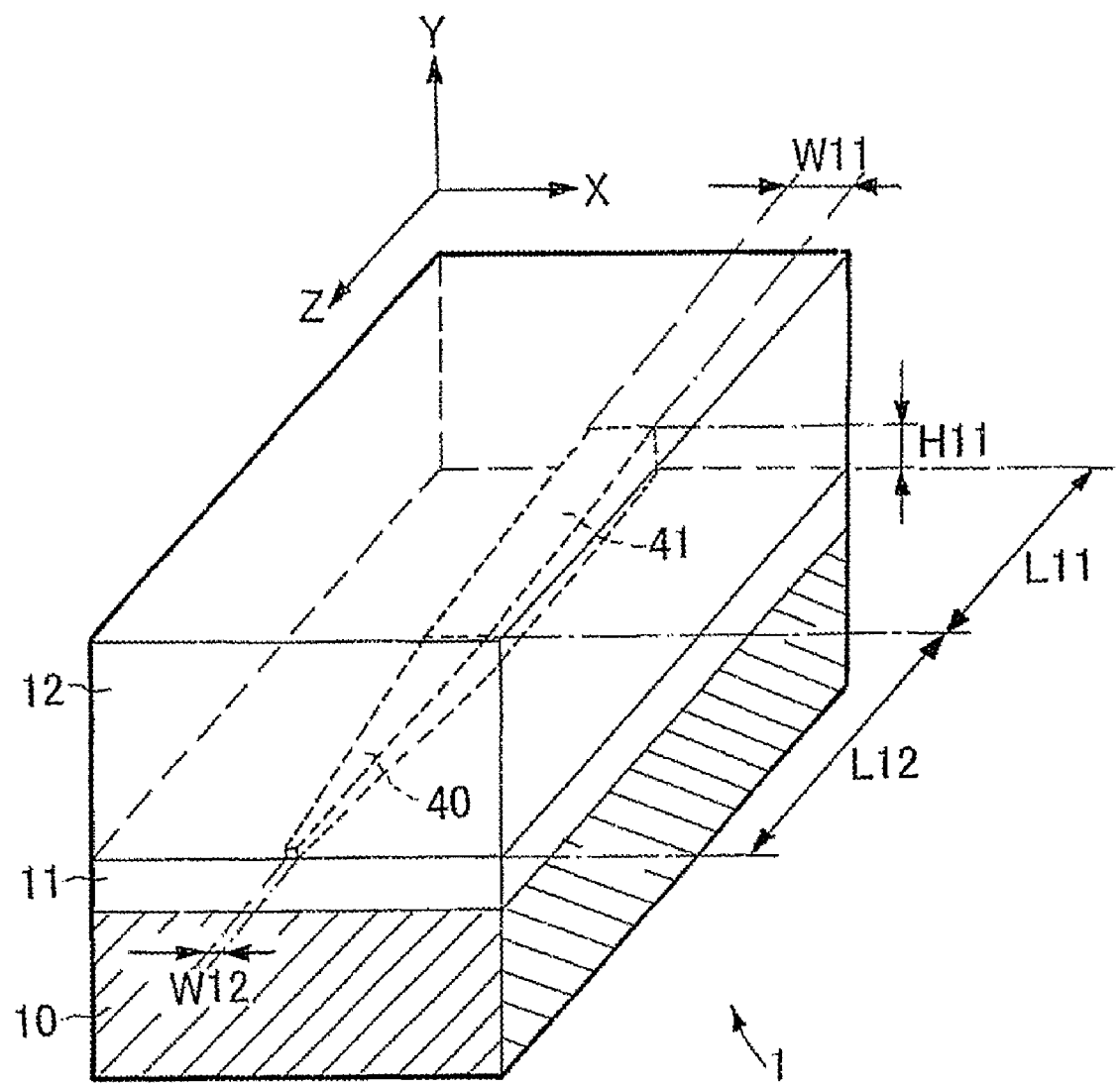
FIG. 4 is a perspective view illustrating the configuration of an optical waveguide according to an Example 2 of the present invention.

FIG. 4 is a schematic diagram illustrating the configuration of an optical waveguide 1 according to the present example. In the optical waveguide 1 illustrated in the diagram, a silicon oxide film 12 is formed on the silicon substrate 10 and becomes a first clad layer. On the silicon oxide film 12, a first core layer is formed.

The first core layer consists of a silicon taper core layer (a tapered waveguide section) 40, the Y-direction thickness and X-direction width of which monotonically decrease in the Z direction; and a silicon core layer 41, which is in the shape of a linear stripe and continuously connected to the silicon taper core layer 40. The silicon core layer 41 and the silicon taper core layer 40 are formed on the same plane (the ZX plane). In the example illustrated in the diagram, the X-direction width, Y-direction thickness, and direction length of the silicon core layer 41 are W11, H11, and L11, respectively. The X-direction width of the silicon taper core layer 40 continuously decreases from W11 to W12; the Y-direction thickness continuously decreases from H11 to zero; the Z-direction length is L2.

Moreover, an area around the silicon core layer 41 and the silicon taper core layer 40 is covered with a clad layer 12 made of a silicon oxide film. The clad layer 12 forms a second clad layer, which is formed on the upper side of the first core layer and is made of a material the refractive index of which is lower than that of the first core layer.

The following describes the production method of the present example.

FIG. 5 is a schematic diagram illustrating the production method of the present example.

Figure 5A:
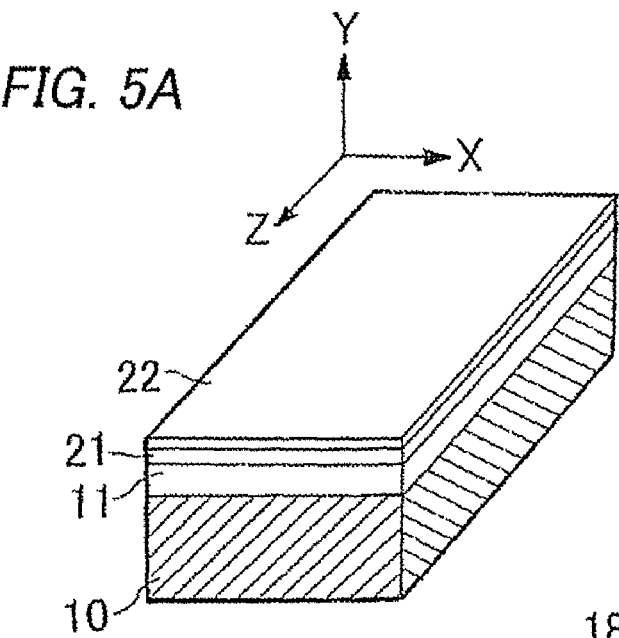
FIGS. 5A to 5D are perspective views illustrating the production steps of the optical waveguide according to the Example 2 of the present invention.

1) Step of FIG. 5A

First, on the upper side of the silicon substrate 10, the silicon oxide film 11, which becomes the first clad layer, and a silicon upper layer 21, which becomes the first core layer, are sequentially formed, and the SOI substrate is formed. On the silicon upper layer 21 of the SOI substrate, a silicon nitride film 22 is stacked using the plasma CVD method (FIG. 5A).

Figure 5B:
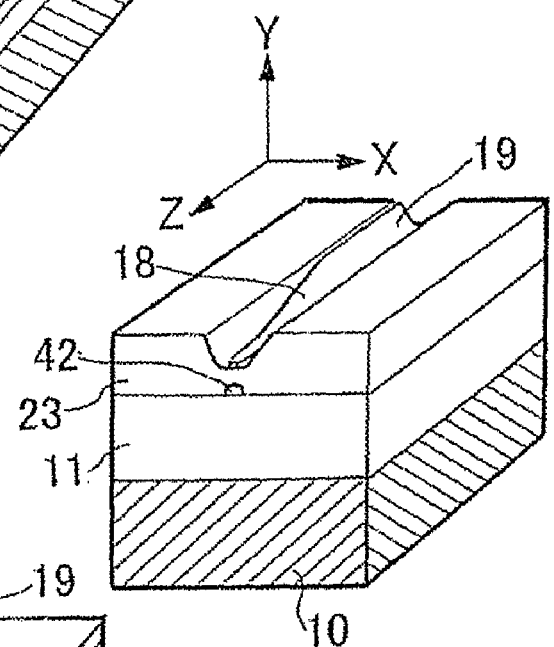

2) Step of FIG. 5B

Then, a tapered stripe 18, which corresponds to the silicon taper core layer 40, and a linear stripe 19, which corresponds to the silicon core layer 41, are formed by patterning in a typical photolithography process on the stacked silicon nitride film 22 so that the stripes are continuously connected (FIG. 5B).

Figure 5C:
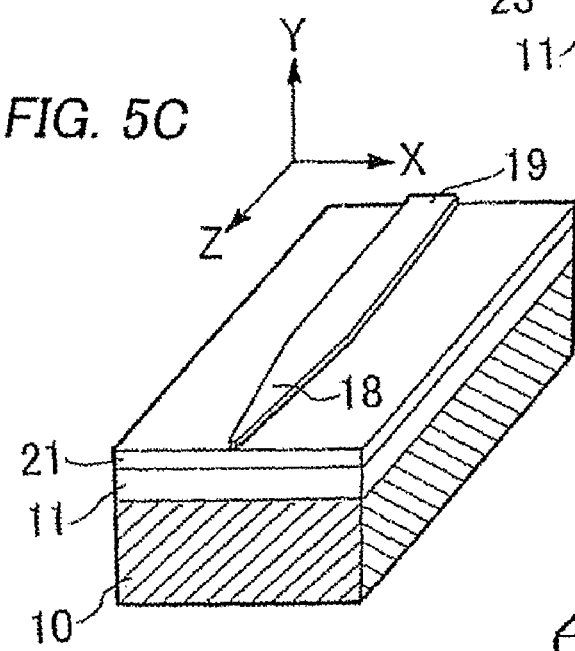

3) Step of FIG. 5C

Subsequently, thermal oxidization is conducted according to the LOCOS method while the stripe patterns 18 and 19 of the silicon nitride film 22 formed by patterning are used as masks (FIG. 5C). Since the $SiO_2$ film is formed in LOCOS oxidation while oxidizing species (oxide ions) disperse from the upper side of the silicon layer 21 other than the mask, the $SiO_2$ layers (the silicon oxide films) 23 are formed on both sides of the mask.

Moreover, the oxidizing species also disperse to the boundary face between the mask and the silicon upper layer 21. Therefore, in an area where the width of the mask is narrow, silicon is transformed into the silicon oxide film 23 even beneath the mask due to the oxidizing species which have dispersed and got into from both sides of the mask, leading to a decrease in thickness of the silicon upper layer 21. That is, it is possible to decrease the width and even thickness of the silicon upper layer 21 by gradually narrowing the width of the mask. Therefore, the tapered optical waveguide core layer, or the silicon taper core layer 40, can be formed.

Figure 5D:
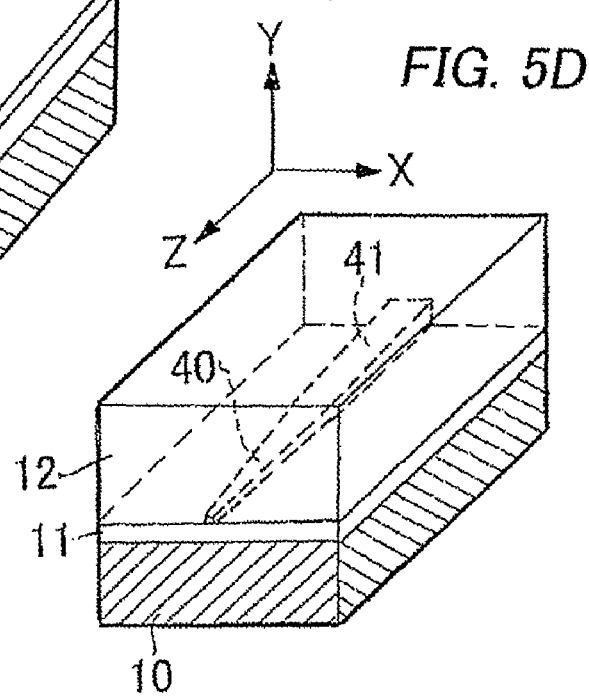

4) Step of FIG. 5D

Subsequently, the stripe patterns 18 and 19 constituting the mask of the silicon nitride film are completely removed by etching, exposing the first core layer consisting of the silicon upper layer 21 formed beneath the mask, or the silicon taper core layer 40 and the silicon core layer 41. Then, the silicon taper core layer 40 and the silicon core layer 41 are embedded in the silicon oxide film 12, which becomes the second clad layer, by the CVD method (FIG. 5D).

In the present exemplary embodiment, thanks to the steps described above, the simple process can make the optical waveguide 1, or a typical spot size conversion optical waveguide, which makes spot size conversion possible without using the etching process of semiconductor.

EXAMPLE 3

The following describes, as Example 3 of the present invention, an example of an optical waveguide suitable for reducing optical excessive losses associated with spot size conversion.

Figure 6:
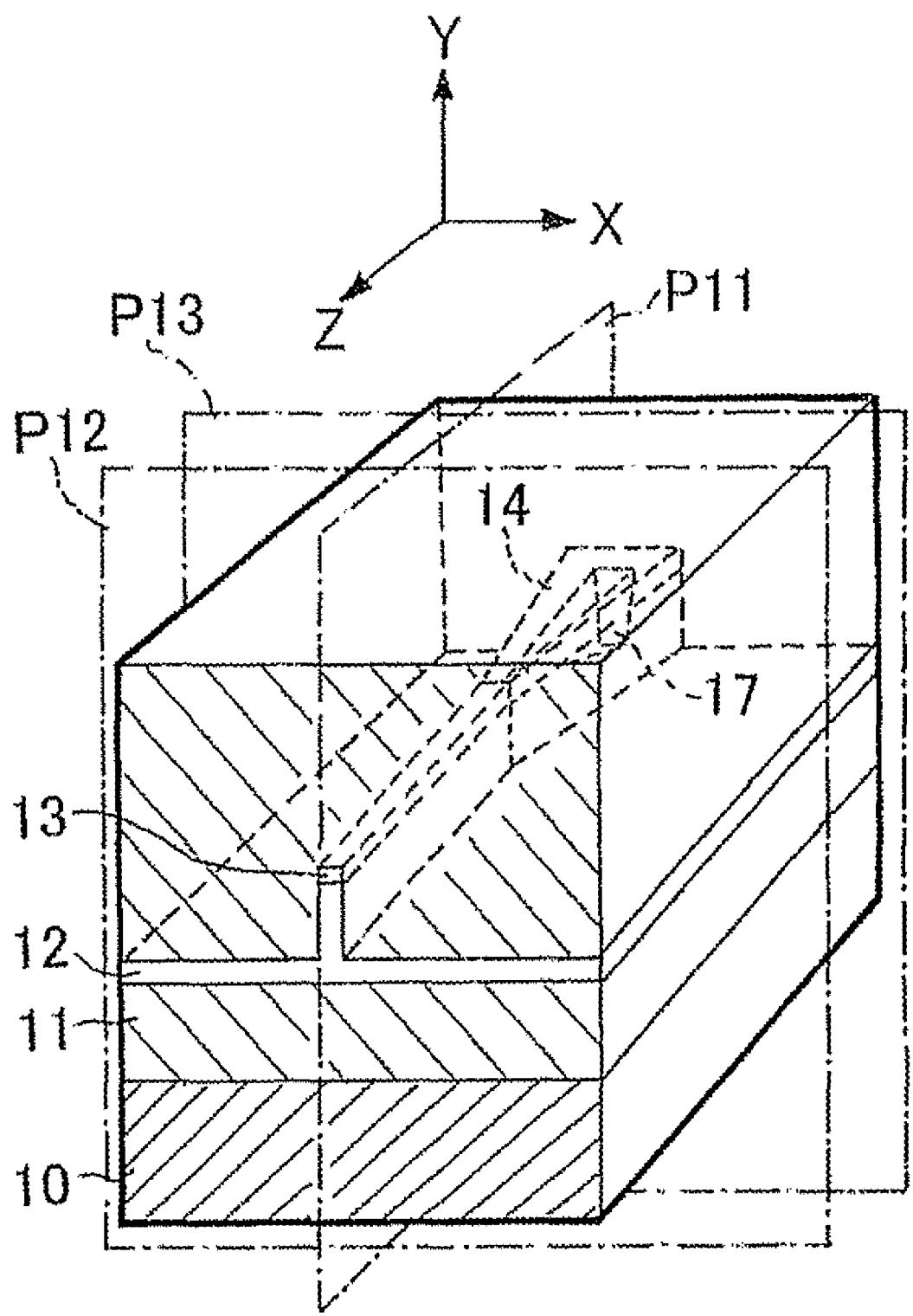
FIG. 6 is a perspective view illustrating the configuration of an optical waveguide according to an Example 3 of the present invention.

FIG. 6 is a perspective view illustrating the configuration of an optical waveguide according to the present example.

In the diagram, on the upper side of the SOI substrate consisting of the silicon substrate 10 and the silicon oxide film 11 formed on the upper side of the silicon substrate 10, a silicon core layer (referred to as a silicon taper core layer, hereinafter) 17 is formed; the silicon taper core layer 17 forms a tapered waveguide section the width and thickness of which monotonically decrease in the propagation direction of light (the direction of the waveguide). On the upper side of the silicon taper core layer 17, a stripe-shaped film (referred to as a silicon nitride film core layer, hereinafter) 13 and a tapered film (referred to as a silicon nitride film taper core layer, hereinafter) 14 are continuously formed; the silicon nitride film core layer 13 and the silicon nitride film taper core layer 14 are made of a silicon nitride film. On the lower side of the silicon nitride film core layer 13, the silicon taper core layer 17 does not exist, and the waveguide core layer is formed only by the silicon nitride film core layer 13. That is, the silicon taper core layer 17 disappears at the terminal section of the silicon nitride film taper core layer 14. Furthermore, an area around the silicon taper core layer 17, the silicon nitride film core layer 13 and the silicon nitride film taper core layer 14 is covered with a clad layer 12 made of a silicon oxide film.

Figure 7:
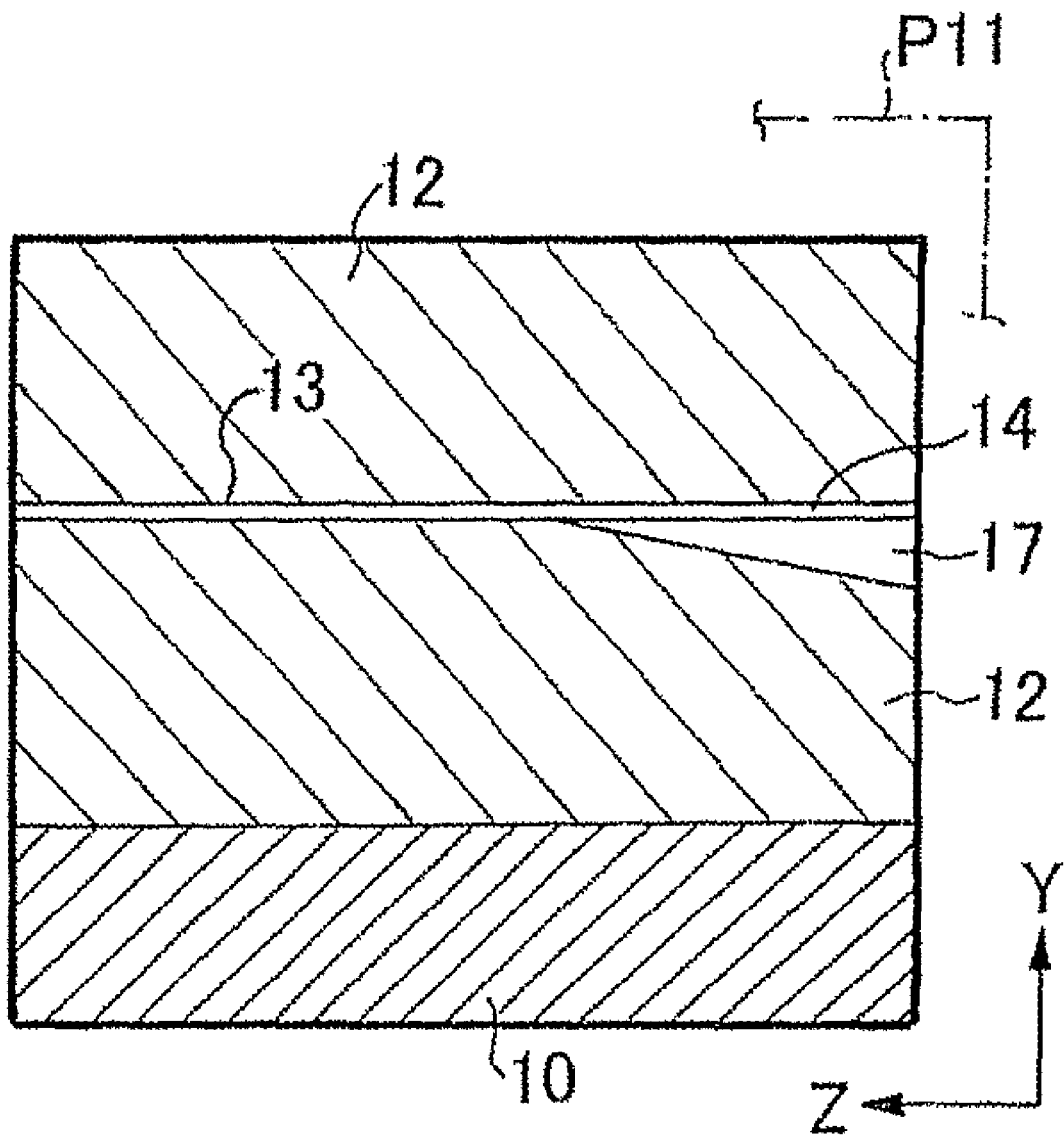
FIG. 7 is a cross-section view of FIG. 6 taken along a plane P11.

FIG. 7 is a cross-section view of the one shown in FIG. 6 taken along the plane P11. In the diagram, the thickness of the silicon taper core layer 17 monotonically decreases along the silicon nitride film taper core layer 14 in the propagation direction of light; the silicon taper core layer 17 disappears at the tip as if the silicon taper core layer 17 is in contact with the silicon nitride film taper core layer 14.

Figure 8:
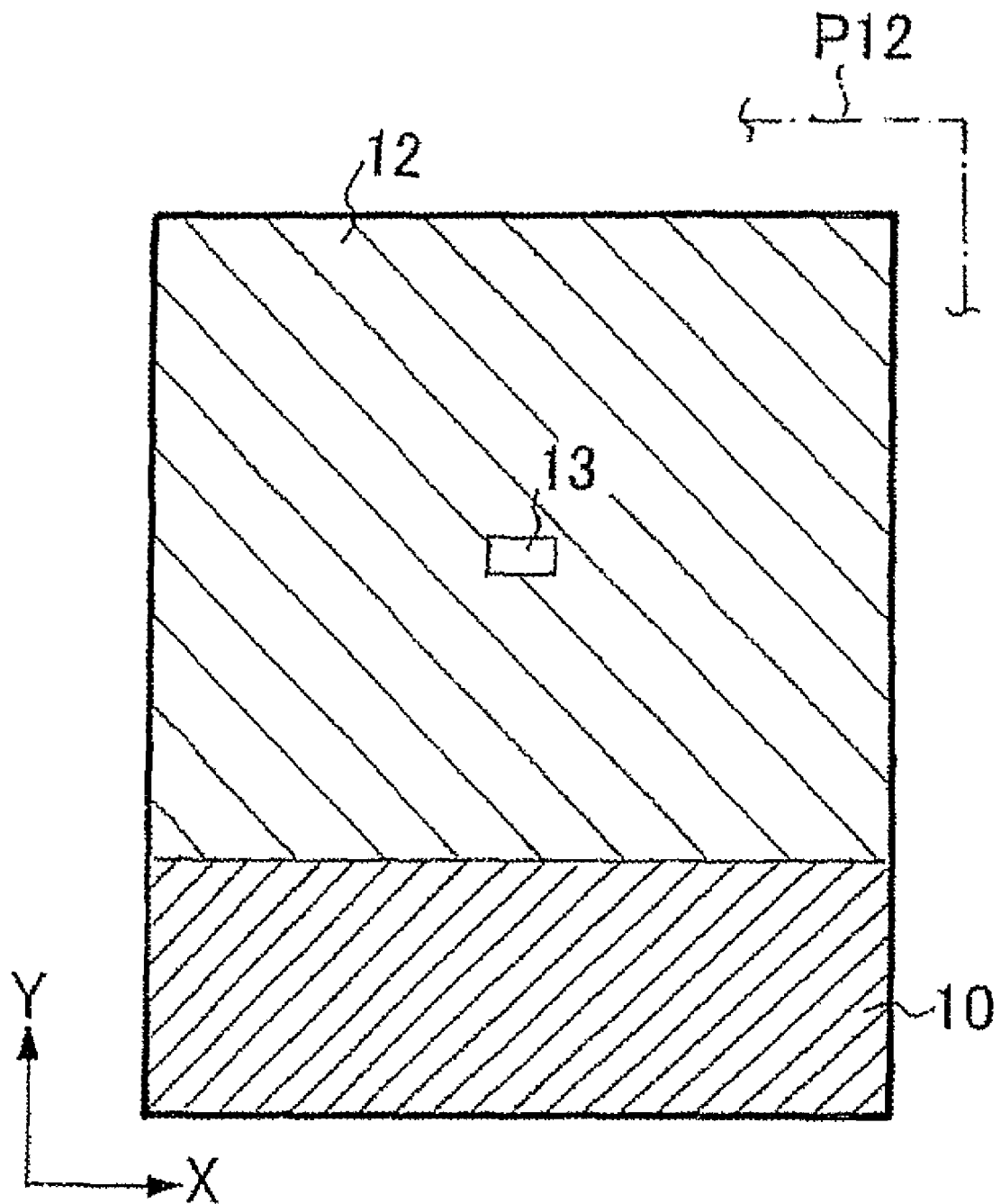
FIG. 8 is a cross-section view of FIG. 6 taken along a plane P12.
Figure 9:
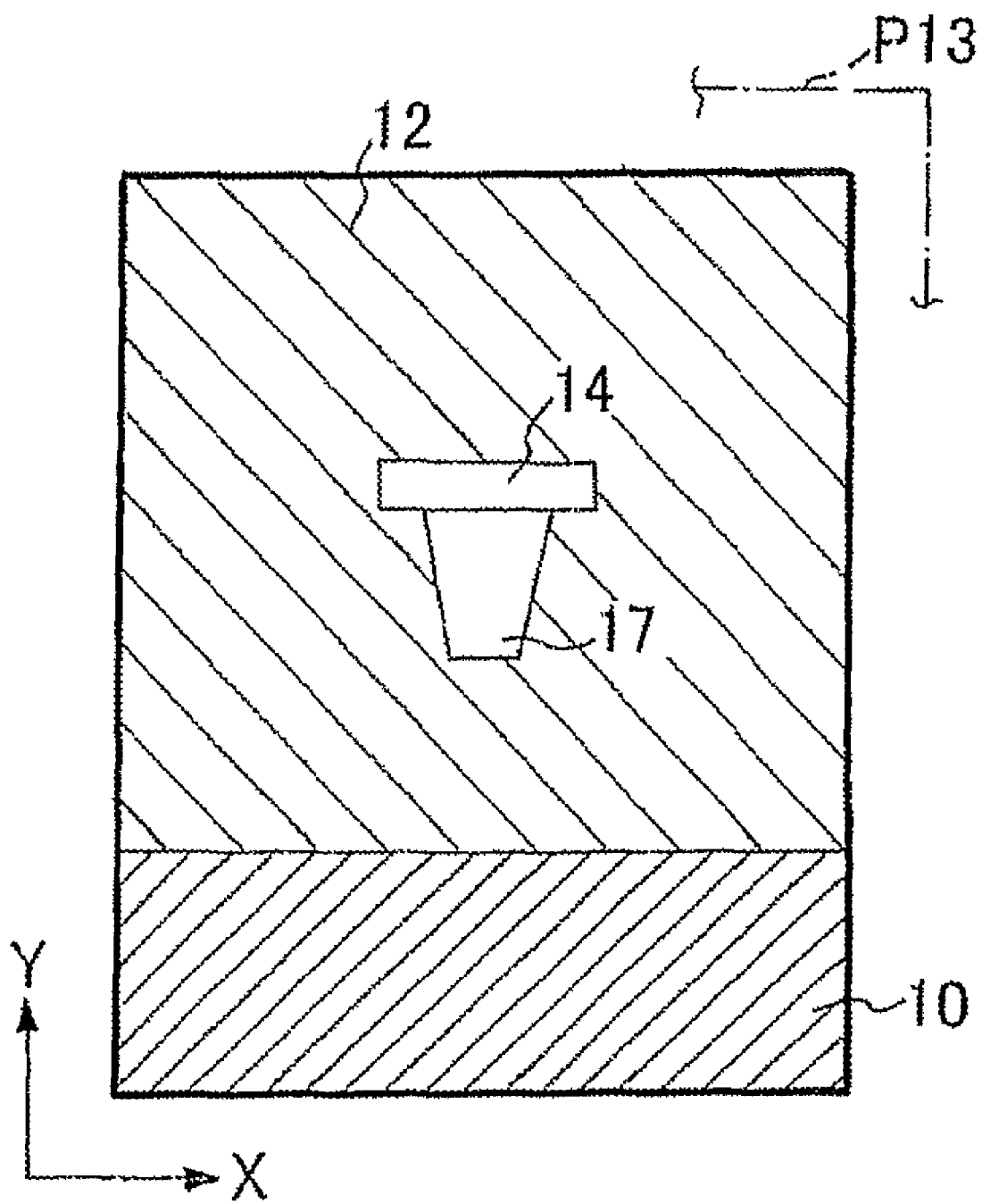
FIG. 9 is a cross-section view of FIG. 6 taken along a plane P13.

FIGS. 8 and 9 are cross-section views of the one shown in FIG. 6 taken along the planes P12 and P13. The silicon taper core layer 17 serves as the waveguide core layer on the cross-section surface of the plane P13 illustrated in FIG. 9, whereas the silicon nitride film taper core layer 14 serves as the waveguide core layer on the cross-section surface of the plane P12 illustrated in FIG. 8.

The following describes the operational mechanism of the present example.

In the present example, an optical wave travels along the optical waveguide where the silicon taper core layer 17 is the waveguide core layer. At the terminal section of the silicon taper core layer 17, the optical wave is coupled with the optical waveguide where the silicon nitride film core layer 13 is the waveguide core layer as the spot size of the optical wave increases. The optical wave travels to the output end of the waveguide with the spot size being maintained at a constant level, and is then optically coupled with an external optical fiber (not shown) with low loss. Therefore, optical excessive losses associated with the above-mentioned spot size conversion can be more reduced than the Example 1.

Figure 10A:
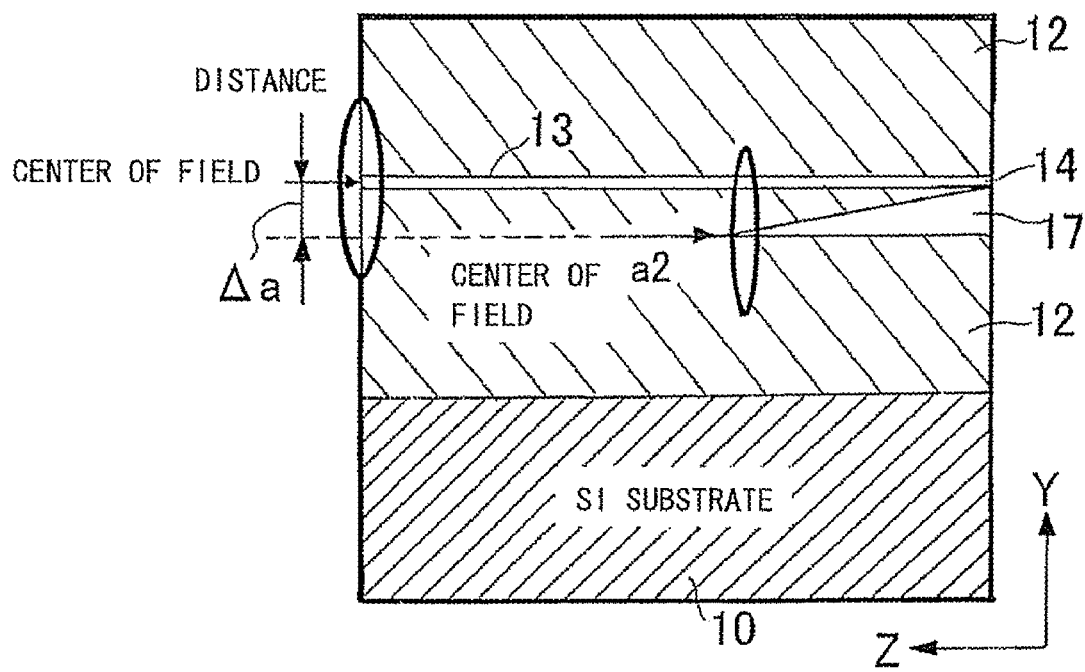
FIGS. 10A and 10B are schematic diagrams illustrating the cross-section surface of the waveguide of the optical waveguide according to Examples 1 and 3 of the present invention.
Figure 10B:
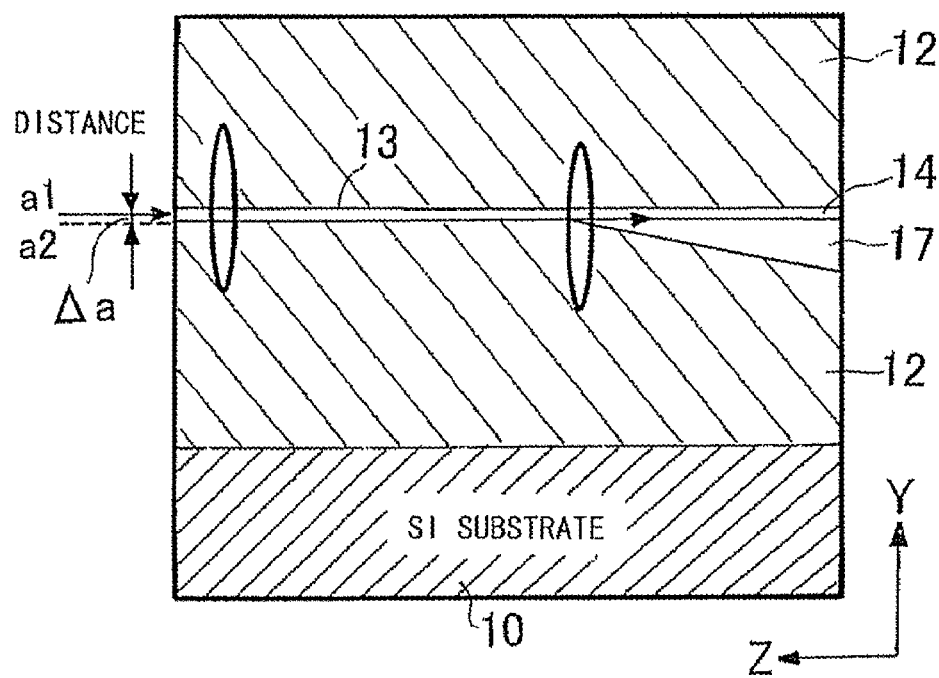

FIG. 10 illustrates the cross-section surfaces of the waveguide core layers, which are along the directions of the optical waveguides, of the Example 1 (FIG. 10A) and the present example (FIG. 10B). As shown in FIGS. 10A and 10B, the distance Δa between a1 and a2, which are respectively the center of the optical wave power (Center of Field) at the silicon nitride film core layer 13 and the center of the optical wave power at the tip of the silicon taper core layer 17, of the present example (see FIG. 10B) is smaller than that of the Example 1 (FIG. 10A). Therefore, according to the present example, optical excessive losses can be more reduced than the Example 1. On the other hand, since the dry etching process is not used in the Example 1, it is possible to reduce the damage to the side wall of the silicon core layer more than the present example; the advantage is therefore to reduce optical propagation losses.

The following describes the production method of the present example.

FIG. 11 is a schematic diagram illustrating the steps of the production method of the present example.

Figure 11A:
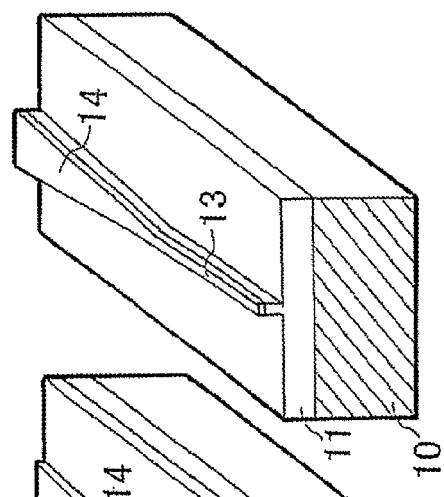
FIGS. 11A to 11E are schematic diagrams illustrating the production steps of the optical waveguide according to the Example 3 of the present invention.

First, on the SOI substrate where the silicon oxide film 11 and the silicon layer 12 are sequentially formed on the upper side of the silicon substrate 10, the silicon nitride film 22 is stacked using the plasma CVD method (FIG. 11A).

Figure 11B:
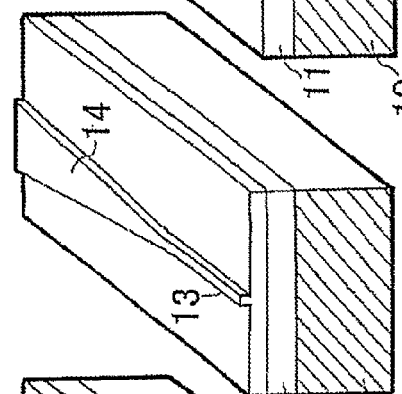

Subsequently, the silicon nitride film 22 is formed by patterning in the shape of a stripe in a typical photolithography process so that the silicon nitride film 22 has a tapered portion constituting the silicon nitride film taper core layer 14 and a linear portion constituting the silicon nitride film core layer 13 (FIG. 11B).

Figure 11C:
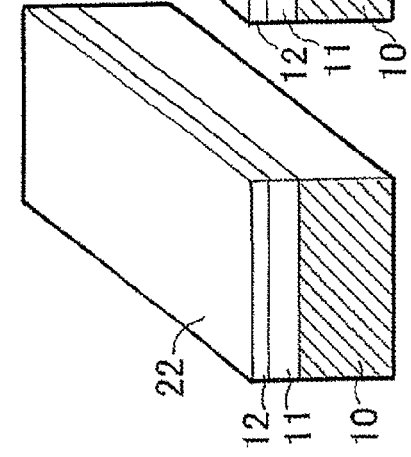

Subsequently, a mesa-type silicon waveguide is formed by dry etching while the nitride film stripe pattern consisting of the tapered portion constituting the silicon nitride film taper core layer 14 and the linear portion constituting the silicon nitride film core layer 13 is used as a mask (FIG. 11C).

Figure 11D:
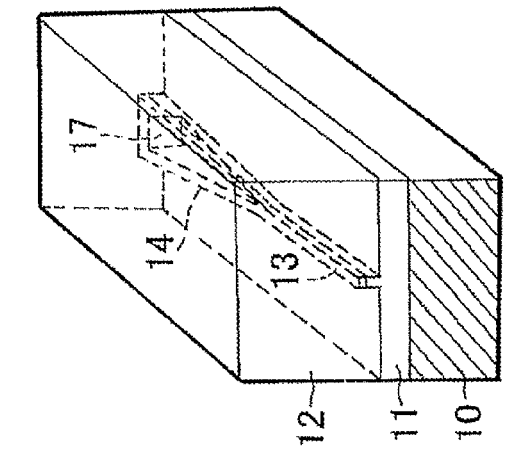

Then, thermal oxidation is done according to the LOCOS method (FIG. 11D). Since the $SiO_2$ film is formed in LOCOS oxidation while oxidizing species (oxide ions) disperse from the upper or lateral side of the silicon other than the mask, the $SiO_2$ layers are formed on both sides of the mask. Even though the oxidizing species also disperse to the boundary face between the mask and the silicon layer, the silicon layer remains thicker immediately beneath the silicon nitride film as the width of the mask narrows because the oxidization speed from the side wall and lower side of the mesa-type silicon is faster than the dispersion speed. Therefore, on the lower side of the silicon nitride film, a tapered silicon core layer, or the silicon taper core layer 17, is formed.

Figure 11E:
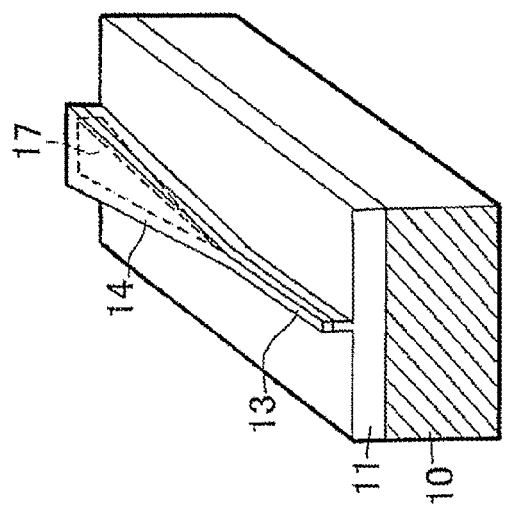

Finally, the $SiO_2$ clad layer 12 is stacked using the plasma CVD method (FIG. 11E).

The optical waveguide of the present example is formed by the steps described above.

EXAMPLE 4

The following describes Example 4 of the present invention.

The above-mentioned method for the optical waveguide of the Examples 1 and 2, which uses the LOCOS method, can be applied to components other than the spot size conversion waveguide designed to increase the efficiency in optical coupling. In one example, the optical waveguide of the present example is applied to a directional coupler having a tapered waveguide, and is used for the conversion of the degree of coupling of the directional coupler.

Figure 12:
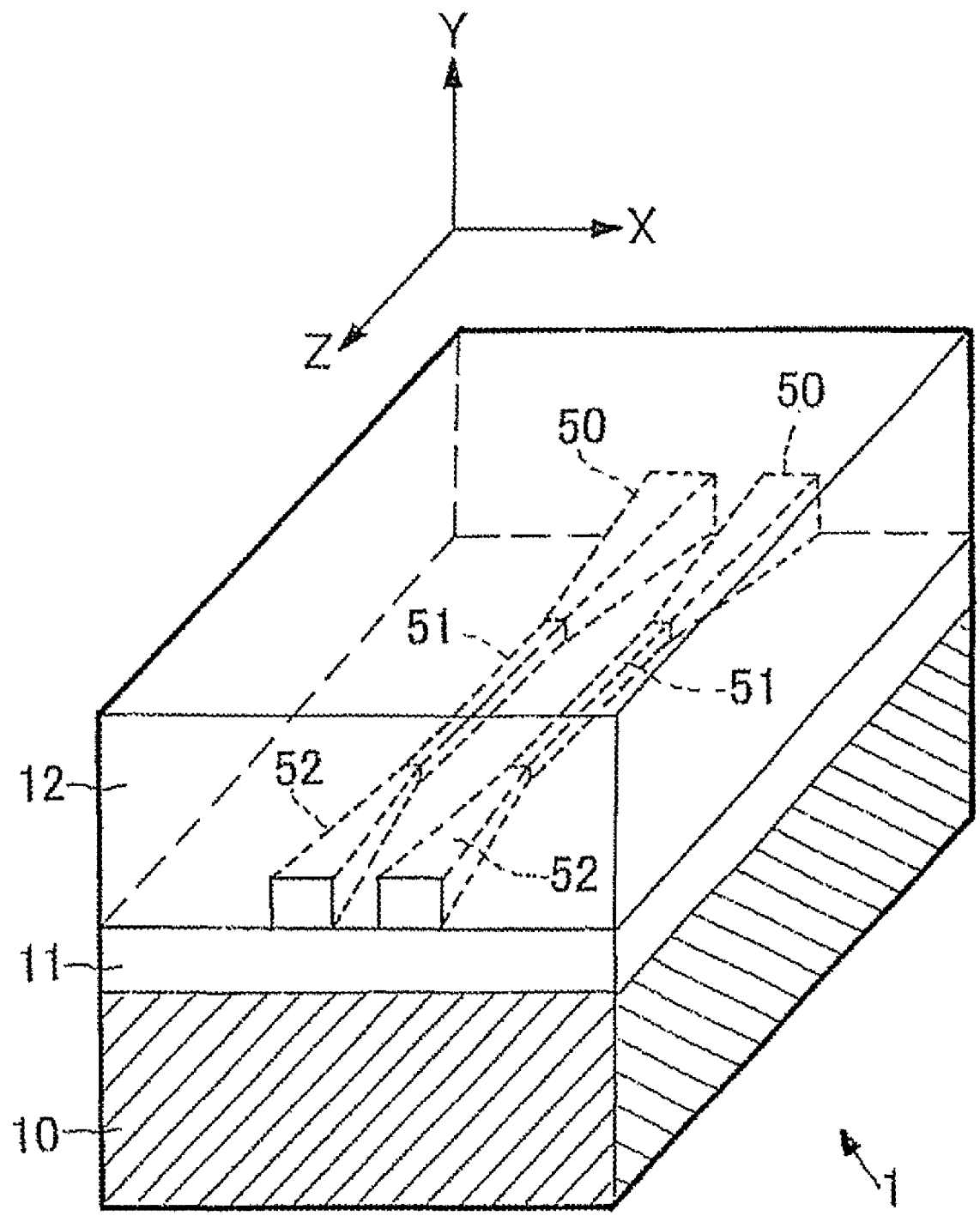
FIG. 12 is a perspective view illustrating the configuration of an optical waveguide according to Example 4 of the present invention.

FIG. 12 is a perspective view illustrating the configuration of an optical waveguide 1 of the present example, i.e., the configuration of the directional coupler having the tapered waveguide.

As shown in the diagram, in the optical waveguide 1, the silicon oxide film 11, which becomes the first clad layer, is formed on the silicon substrate 10. On the upper side of the silicon oxide film 11, the first core layers are formed. The two first core layers are disposed parallel to each other in the Z direction: the first core layer includes a first silicon taper core (a taper waveguide section) layer 50, the Y-direction thickness and X-direction width of which monotonically decrease in the Z direction; a silicon core layer 51, which is in the shape of a linear stripe and continuously connected to the first silicon taper core layer 50; and a second silicon taper core (a tapered waveguide section) layer 52, the Y-direction thickness and X-direction width of which monotonically increase in the Z direction and which is continuously connected to the silicon core layer 51. The first silicon taper core layer 50, the silicon core layer 51 and the second silicon taper core layer 52 are formed on the same plane.

Moreover, an area around the first silicon taper core layer 50, the silicon core layer 51 and the second silicon taper core layer 50 is covered with a clad layer 12 made of a silicon oxide film. The clad layer 12 forms a second clad layer, which is formed on the upper side of the first core layer and is made of a material the refractive index of which is lower than that of the first core layer.

The following describes the operational mechanism of the present example.

First, in the optical waveguide 1, an optical wave input into one of the two first silicon taper core layers 50 constituting the tapered waveguide travels through the tapered waveguide in the Z direction while the field size thereof becomes large, and, at one of the two silicon core layers 51 constituting the linear waveguides, is coupled with the silicon core layer 51 constituting the other linear waveguide. Therefore, the optical power is divided. That is, the silicon core layer 51 constituting the two linear waveguides disposed parallel to each other serves as a directional coupler.

In general, in the silicon waveguide the relative refractive index difference of which is large, the degree to which the optical wave field is trapped in the core layer increases while the coupling between the waveguides decreases. Accordingly, the coupling length needs to be increased in order to obtain a predetermined degree of coupling. The problem can be solved by decreasing the size of the waveguide core layer, enlarging the optical wave field, and increasing the coupling between the waveguides. The tapered waveguide that uses the LOCOS method of the present invention is effective in enlarging the optical wave field.

Therefore, according to the present example, with the use of a simple method according to which semiconductor etching is not used, it is possible to make the optical waveguide 1, or the directional coupler having the tapered waveguide, that can partially and adiabatically change (while suppressing losses) coupling factors between the waveguides of the directional coupler.

OTHER EXEMPLARY EMBODIMENTS

In an optical waveguide according to another exemplary embodiment of the present invention, the following is also possible: the first core layer has disappeared at the tip of the tapered waveguide portion where the cross-sectional area of the first core layer monotonically decreases; a second core layer formed by the patterning of a dielectric material the refractive index of which is higher than that of the second clad layer is loaded onto the upper side of the first core layer; the second core layer, like the first core layer, has a portion the width of which monotonically changes in the propagation direction of light; the second core layer having a constant width is formed as well on the upper side of the area where the first core layer has disappeared; and a third clad layer consisting of a material the refractive index of which is lower than that of the second core layer is formed on the upper side of the second core layer.

In an optical waveguide according to another exemplary embodiment of the present invention, the following is also possible: The first core layer has disappeared at the tip of the tapered waveguide portion where the cross-sectional area of the first core layer monotonically decreases; a second core layer formed by the patterning of a dielectric material the refractive index of which is higher than that of the second clad layer is loaded onto the upper side of the first core layer; the second core layer, like the first core layer, has a portion the width of which monotonically changes in the propagation direction of light; the second core layer having a constant width is formed as well on the upper side of the area where the first core layer has disappeared; the midpoint of the height of the first core layer is so formed as to monotonically approach the second core layer in the direction of the waveguide which is the propagation direction of light; a third clad layer consisting of a material the refractive index of which is lower than that of the second core layer is formed on the upper side of the second core layer.

In an optical waveguide according to another exemplary embodiment of the present invention, the third clad layer may be made of a polymer material. Moreover, the first core layer may be made of silicon, and the second and third clad layers may be made of a silicon oxide film. Furthermore, the second core layer may be made of a silicon nitride film.

In a production method for an optical waveguide according to another exemplary embodiment of the present invention, a step of stacking the silicon oxide film using the CVD method may be used as a step of forming the third clad layer. Moreover, a step of stacking the silicon oxide film using a sputtering method may be used as a step of forming the third clad layer. Furthermore, a step of forming a polymer film using a spin coating method may be used as a step of forming the third clad layer.

According to another exemplary embodiment of the present invention, the spot size converter includes one of the above-mentioned optical waveguides.

According to the present invention, the directional coupler includes one of the above-mentioned optical waveguides.

The above describes, in detail, the exemplary embodiments and examples of the present invention. However, the present invention is not limited to the above-described representative exemplary embodiments and examples. Those skilled in the art can make various modifications and alterations within the scope of the present invention based on the appended claims. Those modified or altered are also within the scope of the right of the present invention.

INDUSTRIAL APPLICABILITY

The present invention can be applied to a planar optical waveguide used in the planar lightwave circuit (PLC) constituting the essential part of an optical communication system such as a spot size converter and a directional coupler, and to a production method thereof.

The invention claimed is:

1. An optical waveguide comprising:
a first clad layer formed on a semiconductor substrate;
a first core layer formed on the upper side of the first clad layer with the use of a semiconductor material the refractive index of which is higher than that of the first clad layer; and
a second clad layer formed on the upper side of the first core layer with the use of a material the refractive index of which is lower than that of the first core layer, wherein
the width of the first core layer is defined based on the width of an unoxidized semiconductor material sandwiched between oxide films the parts of which are thermally oxidized,
the thickness of the first core layer is defined based on the thickness of an unoxidized semiconductor material sandwiched between the first clad layer and an oxide film the part of which is thermally oxidized, and
at least the input/output portion of the optical waveguide has a tapered waveguide portion where both of the width and the thickness of the first core layer monotonically decrease or both of the width and the thickness monotonically increase with respect to the propagation direction of light.

2. The optical waveguide according to claim 1, wherein
the first core layer has disappeared at the tip of the tapered waveguide portion where the cross-sectional area of the first core layer monotonically decreases,
a second core layer formed by the patterning of a dielectric material the refractive index of which is higher than that of the second clad layer is loaded onto the upper side of the first core layer,
the second core layer, like the first core layer, has a portion the width of which monotonically changes in the propagation direction of light,
the second core layer having a constant width is formed as well on the upper side of the area where the first core layer has disappeared, and
a third clad layer consisting of a material the refractive index of which is lower than that of the second core layer is formed on the upper side of the second core layer.

3. The optical waveguide according to claim 1, wherein
the first core layer has disappeared at the tip of the tapered waveguide portion where the cross-sectional area of the first core layer monotonically decreases,
a second core layer formed by the patterning of a dielectric material the refractive index of which is higher than that of the second clad layer is loaded onto the upper side of the first core layer,
the second core layer, like the first core layer, has a portion the width of which monotonically changes in the propagation direction of light,
the second core layer having a constant width is formed as well on the upper side of the area where the first core layer has disappeared,
the midpoint of the height of the first core layer is so formed as to monotonically approach the second core layer in the direction of the waveguide which is the propagation direction of light, and
a third clad layer consisting of a material the refractive index of which is lower than that of the second core layer is formed on the upper side of the second core layer.

4. The optical waveguide according to claim 2, wherein the third clad layer is made of a polymer material.

5. The optical waveguide according to claim 2, wherein the first core layer is made of silicon, and the second and third clad layers are made of a silicon oxide film.

6. The optical waveguide according to claim 2, wherein the second core layer is made of a silicon nitride film.

7. A production method for an optical waveguide comprising:
- a step of forming a silicon nitride film on the upper surface of a silicon upper layer of a SOI (Silicon on Insulator) substrate having the silicon upper layer formed on the upper surface of a silicon oxide film on a silicon substrate;
- a step of carrying out patterning to form the silicon nitride film in the shape of a stripe so that the silicon nitride film has a tapered portion the width of which monotonically changes;
- a step of carrying out LOCOS (Local oxidation of Silicon) oxidation while the silicon nitride film formed by patterning is used as a mask in order to form a second clad layer and also form on the lower side of the silicon nitride film a first core layer of silicon whose width monotonically narrows in the direction of stripe and whose thickness too narrows monotonically;
- a step of removing the silicon nitride film; and
- a step of stacking a third clad layer after removing the silicon nitride film.

8. A production method for an optical waveguide comprising:
- a step of forming a silicon nitride film on the upper surface of a silicon upper layer of a SOI (Silicon on Insulator) substrate having the silicon upper layer formed on the upper surface of a silicon oxide film on a silicon substrate;
- a step of carrying out patterning to form the silicon nitride film in the shape of a stripe so that the silicon nitride film has a tapered portion the width of which monotonically changes;
- a step of carrying out the LOCOS (Local oxidation of Silicon) oxidation while the silicon nitride film formed by patterning is used as a mask in order to form a second clad layer and also form on the lower side of the silicon nitride film a first core layer whose width monotonically narrows in the direction of stripe, whose thickness too narrows monotonically, and whose silicon layer disappears at a tapered tip section; and
- a step of stacking a third clad layer on the upper side of the silicon nitride film.

9. A production method for an optical waveguide comprising:
- a step of forming a silicon nitride film on the upper surface of a silicon upper layer of a SOI (Silicon on Insulator) substrate having the silicon upper layer formed on the upper surface of a silicon oxide film on a silicon substrate;
- a step of carrying out patterning to form the silicon nitride film in the shape of a stripe so that the silicon nitride film has a tapered portion the width of which monotonically changes;
- a step of forming a silicon mesa by removing part of the silicon upper layer in an etching process in which the silicon nitride film formed by patterning is used as a mask;
- a step of carrying out the LOCOS (Local oxidation of Silicon) oxidation on the silicon mesa while the silicon nitride film is used as a mask in order to form on the lower side of the silicon nitride film a first silicon core layer whose width monotonically narrows in the direction of stripe, whose thickness too narrows monotonically, and whose silicon layer disappears at a tapered tip section; and
- a step of stacking the third clad layer on the upper side of the silicon nitride film.

10. The production method for an optical waveguide according to claim 7, wherein
a step of stacking the silicon oxide film using the CVD (Chemical Vapor Deposition) method is used as a step of forming the third clad layer.

11. The production method for an optical waveguide according to claim 7, wherein
a step of stacking the silicon oxide film using a sputtering method is used as a step of forming the third clad layer.

12. The production method for an optical waveguide according to claim 7, wherein
a step of forming a polymer film using a spin coating method is used as a step of forming the third clad layer.

13. A spot size converter that uses the optical waveguide claimed in claim 1.

14. A directional coupler that uses the optical waveguide claimed in claim 1.

* * * * *